(12) United States Patent
Lear et al.

(10) Patent No.: US 11,879,743 B2
(45) Date of Patent: Jan. 23, 2024

(54) METHOD AND DEVICE FOR IDENTIFYING A SHIFT IN A POINT OF INTEREST

(71) Applicant: Verizon Patent and Licensing Inc., Arlington, VA (US)

(72) Inventors: Peter J. Lear, Scarborough (CA); Victor J. Rehorst, Whitby (CA); Sonya Ticku, Scarborough (CA); Simon Ang, Thornhill (CA); Elizabeth A. Burgess, Toronto (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 391 days.

(21) Appl. No.: 16/410,352

(22) Filed: May 13, 2019

(65) Prior Publication Data

US 2020/0363225 A1 Nov. 19, 2020

(51) Int. Cl.
*G01C 21/34* (2006.01)
*G06F 16/23* (2019.01)
*G06F 16/29* (2019.01)
*G01C 21/36* (2006.01)

(52) U.S. Cl.
CPC ..... *G01C 21/3476* (2013.01); *G01C 21/3679* (2013.01); *G06F 16/2358* (2019.01); *G06F 16/29* (2019.01)

(58) Field of Classification Search
CPC .......... G01C 21/3476; G01C 21/3679; G01C 21/387; G01C 21/3811; G06F 16/2358; G06F 16/29; G06F 16/909
See application file for complete search history.

(56) References Cited

U.S. PATENT DOCUMENTS

| | | | | |
|---|---|---|---|---|
| 9,939,813 | B2* | 4/2018 | Shashua | G08G 1/09623 |
| 10,509,810 | B2* | 12/2019 | Kreft | G06T 11/60 |
| 10,937,191 | B2* | 3/2021 | Iyer | G06T 7/74 |
| 2016/0147826 | A1* | 5/2016 | Mishra | G01C 21/32 707/736 |
| 2016/0179874 | A1* | 6/2016 | Lynch | G06F 16/2379 707/690 |
| 2016/0313130 | A1* | 10/2016 | Baselau | G08G 1/054 |
| 2019/0259182 | A1* | 8/2019 | Sarukkai | G06K 9/00791 |
| 2019/0265050 | A1* | 8/2019 | Fujimoto | G01C 21/3881 |
| 2021/0366281 | A1* | 11/2021 | Yagasaki | G01C 21/3811 |

\* cited by examiner

*Primary Examiner* — Geepy Pe
*Assistant Examiner* — Daniel Tyler Reich

(57) ABSTRACT

A device for identifying a shift in a point of interest (POI). The device may receive location information of the POI, determine a geographical coordinate of the POI based on the location information and using map data, determine a routable attribute of the POI based on the geographical coordinate and using updated map data, identify a shift in the POI between the map data and the updated map data based on an inconsistency between the routable attribute and the map data, determine an aggregate score based on the routable attribute and the inconsistency between the routable attribute and the map data when the shift in the POI is identified, and cause an action to be performed based on the aggregate score.

20 Claims, 7 Drawing Sheets

METHOD AND DEVICE FOR IDENTIFYING A SHIFT IN A POINT OF INTEREST

BACKGROUND

A navigation system can provide location information, direction information, and/or navigation information. For example, an automotive navigation system can include a satellite receiver that determines a position of a vehicle, and performs routing functions to provide directions to a driver of the vehicle. In a navigation system, a point of interest (POI) is a specific geographical location corresponding to a residence, a place of business, an attraction site, and/or another destination that may be useful to memorialize. In a global positioning system (GPS), a POI can be specified by a name, a description, a physical address, a set of geographical coordinates (e.g., a combination of a latitudinal coordinate, a longitudinal coordinate, and/or an elevation), and/or the like.

DETAILED DESCRIPTION OF PREFERRED EMBODIMENTS

Figure 1A:
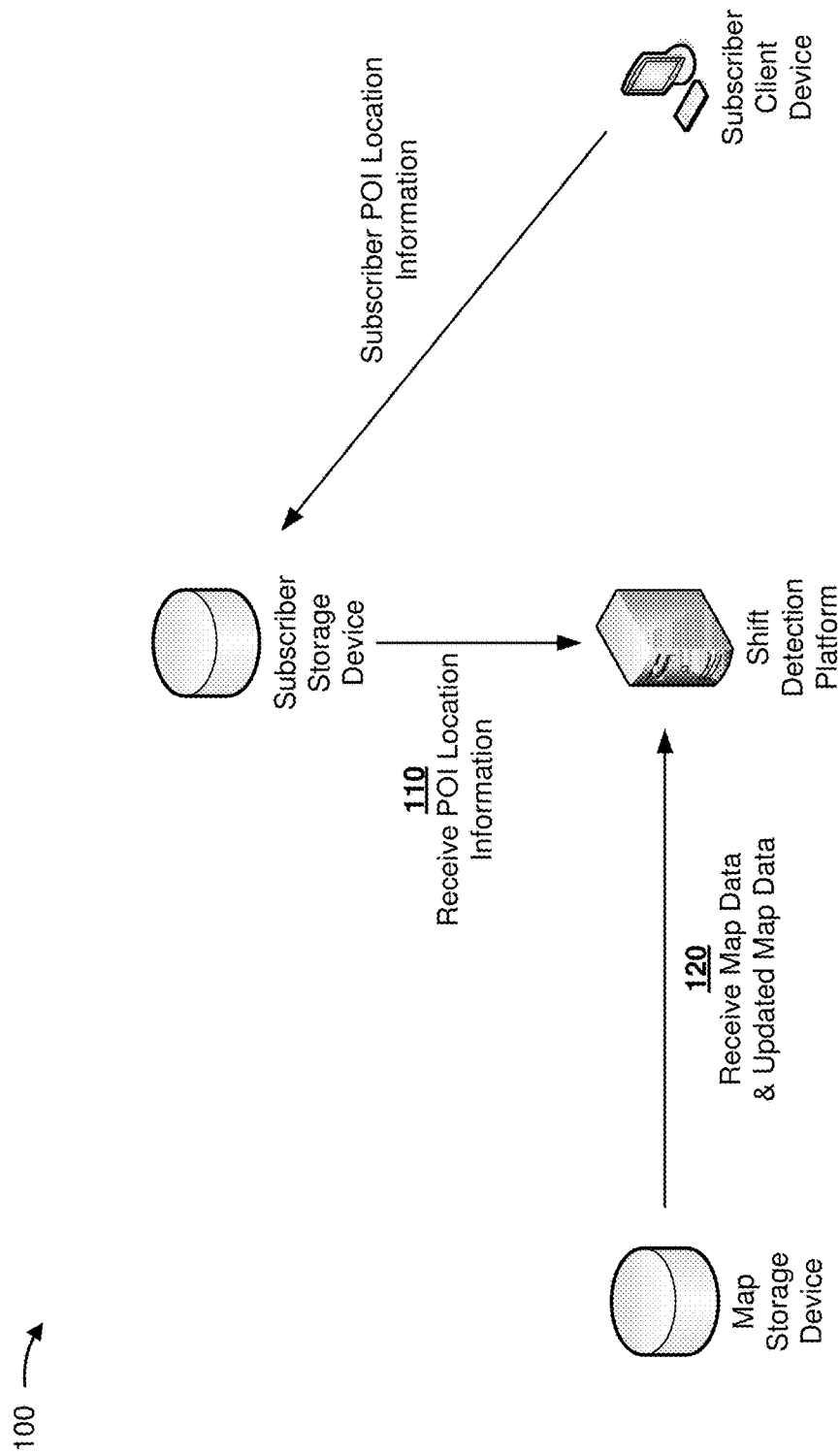
FIGS. 1A-1D are diagrams of one or more example implementations described herein.

The following detailed description of example implementations refers to the accompanying drawings. The same reference numbers in different drawings may identify the same or similar elements.

Updated map data is routinely released to account for a change that may affect routing information to or from a point of interest (POI), such as a change in a physical address of the POI, a change in a road name, a change in road geometry near the POI, a change in a road restriction on a road leading to the POI, and/or the like. At times, the updated map data may cause a shift in a POI that can affect routing information associated with the POI. A shift in a POI may be caused by an inconsistency in a routable attribute of the POI relative to a prior release of the map data (e.g., an inconsistency in the physical address of the POI, an inconsistency in the geographical coordinates of the POI, an inconsistency in a relationship between the POI and a road segment nearest to the POI, and/or the like). In some cases, the shift in the POI may be sufficient to cause a navigation system to calculate a new route to the POI (e.g., a route that is shorter and/or faster than a previous route determined using prior map data).

Although updating map data may can be beneficial, some updates may adversely affect routing information. For example, a shift in a POI associated with a distribution company may cause a navigation system to calculate a new route for a truck driver that directs the truck driver to a road with weight restrictions and/or directs the truck driver to an inappropriate entrance of a distribution center of the distribution company. The shift in the POI may remain unnoticed until the truck driver is already en route, in which case the truck driver may need to pull over to manually revise the POI on a navigation device and/or contact a dispatcher for a new route. In some cases, the distribution company may need to contact a navigation service provider to correct the shift in the POI. Such situations may cause unwanted delays, traffic and/or safety hazards, and/or otherwise unnecessary use of computational and/or network resources (e.g., processing resources, memory resources, power resources, communication resources, and/or the like).

Some implementations described herein may provide a shift detection platform that automatically scans map data (e.g., a prior release of the map data) and updated map data for a shift in the POI of a subscriber. In some implementations, the shift detection platform uses geographical coordinates of the POI to determine a routable attribute of the POI within the updated map data. The routable attribute may include a physical address of the POI, a relationship between the POI and a road segment nearest to the POI, and/or the like. In some implementations, the shift detection platform may identify a shift in the POI based on an inconsistency between the routable attribute and the map data. In some implementations, the shift detection platform may determine an aggregate score based on the identified inconsistency, and cause an action to be performed based on the aggregate score. In some implementations, the shift detection platform may notify the subscriber of the identified shift in the POI, verify the shift in the POI, modify the shift in the POI, and/or the like.

In this way, the shift detection platform is able to automatically and efficiently identify, assess, and/or verify a shift in a POI that may be caused by updated map data prior to releasing the updated map data. By automatically identifying the shift in the POI and verifying an associated change in routing information prior to releasing the updated map data, the shift detection platform is able to improve the accuracy of a navigation service. By improving the accuracy of the navigation service, the shift detection platform enables safer and more efficient routing to the POI, and reduces downtime associated with routing errors. By enabling safer and more efficient routing, the shift detection platform reduces the risk of traffic accidents, reduces wear and tear on vehicles, and conserves energy (e.g., fuel) that would otherwise be used by a misguided driver. By enabling accurate and efficient routing, the shift detection platform conserves computational and/or network resources (e.g., processing resources, memory resources, power resources, communication resources, and/or the like) that would otherwise be used to reroute the driver.

FIGS. 1A-1D are diagrams of one or more example implementations 100 described herein. As shown in FIGS. 1A-1D, the example implementation(s) 100 may include a shift detection platform, a subscriber client device, a subscriber storage device, and a map storage device. FIGS. 1A-1D present one or more functions that may be performed by the shift detection platform to identify a shift in a POI between prior map data and updated map data. For example, the shift detection platform may determine geographical coordinates and a routable attribute of the POI, identify a shift in the POI based on an inconsistency in the routable attribute between the prior map data and the updated map data, determine an aggregate score for the shift in the POI, and cause an action based on the aggregate score. In some implementations, one or more functions of the shift detection platform may be performed by another device, such as the subscriber storage device, the map storage device, and/or the like. In some implementations, the shift detection platform may be implemented by the subscriber storage device, the map storage device, and/or the like.

In some implementations, the shift detection platform may be used in association with a subscription service that is supported by the subscriber storage device and/or the map storage device. For example, the subscription service may provide a geocoding service, a reverse-geocoding service, a navigation service, a map service, and/or another service relating to managing, processing, and/or analyzing map data. In some implementations, the subscription service may geocode a physical address of a POI into a set of geographical coordinates, and/or reverse-geocode a set of geographical coordinates of a POI into a physical address. In some implementations, the subscription service may provide routing information that can be used by a subscriber and/or an affiliate of the subscriber to navigate to the POI. In some implementations, the subscription service may provide routing information to a navigation service provider (e.g., to a navigation server device that provides routing information to an associated navigation device). In some implementations, the subscription service may provide routing information directly to an end user of a navigation service (e.g., to a navigation device that is implemented within a vehicle navigation system, a mobile device, and/or the like).

In some implementations, the subscription service may enable a subscriber (e.g., a distribution company, a logistics company, a transportation company, a fleet management company, a vehicle manufacturer, an individual driver, and/or the like) to subscribe to the subscription service using the subscriber client device (e.g., a computer, a smart phone, a mobile device, and/or the like). In some implementations, the subscriber storage device may receive location information of a POI provided by the subscriber. The location information may be received as a physical address and/or geographical coordinates of the POI. The POI may correspond to a residence, a place of business, a distribution center, a manufacturing facility, and/or another POI associated with the subscriber. In some implementations, the POI may correspond to a location of the subscriber, a location of a building, a facility, and/or another structure managed by the subscriber, a location of an affiliate of the subscriber, a location of a customer of the subscriber, a frequent destination of the subscriber, and/or the like.

In some implementations, the subscription service may periodically and/or intermittently release updated routing information corresponding to updated map data. For example, the updated map data may include a change in road geometry (e.g., due to a road closure, a modification to a road, a formation of a new road, and/or another topographical change), a change in a road restriction (e.g., a weight restriction, a height restriction, a truck restriction, and/or the like), a change in a road name, a change in a physical address of a POI (e.g., due to a change in a road name, a change to a building, a facility, and/or another structure at the POI, and/or the like), and/or another shift in the POI that may affect the routing information provided to the subscriber. As discussed below, the subscription service may use the shift detection platform to identify a shift in the POI prior to releasing the updated routing information. In some implementations, the shift detection platform may notify the subscriber of the shift in the POI, enable the subscriber to verify the shift in the POI, and/or enable the subscriber to modify the shift in the POI. In some implementations, the shift detection platform may automatically push the updated routing information to a navigation service provider and/or a navigation device associated with the subscriber.

As shown in FIG. 1A, and by reference number 110, the shift detection platform may receive location information of a POI of a subscriber from the subscriber storage device. In some implementations, the location information may be received as a physical address of the POI. For example, the physical address may be received in the form of textual data describing the street address (e.g., "123 Main Street") of a building, a facility, and/or another structure associated with the POI. In some implementations, the location information may include another type of unique identifier (e.g., a unique name) of the structure located at the POI. In some implementations, the location information may be received as geographical coordinates (e.g., a combination of a latitudinal coordinate, a longitudinal coordinate, and/or an elevation). In some implementations, the location information may be provided using a vector and/or a parameter associated with another coordinate system that may be used to locate the POI. In some implementations, the location information may be received directly from the subscriber client device.

As further shown in FIG. 1A, and by reference number 120, the shift detection platform may receive map data and updated map data from the map storage device. The map data and/or the updated map data may include an index associating one or more physical addresses with one or more corresponding sets of geographical coordinates. In some implementations, the map data may include data relating to a current map version and/or a prior map version. In some implementations, the updated map data may include a revised version of the map data that accounts for a change in an attribute within the index since the release of the map data (e.g., a change in road geometry, a change in a road name, a change in a structure, a change in a physical address, a change in a road restriction, and/or the like). The shift detection platform may use the location information provided by the subscriber storage device, to receive the map data and the updated map data relevant to the geographical area of the POI.

Figure 1B:
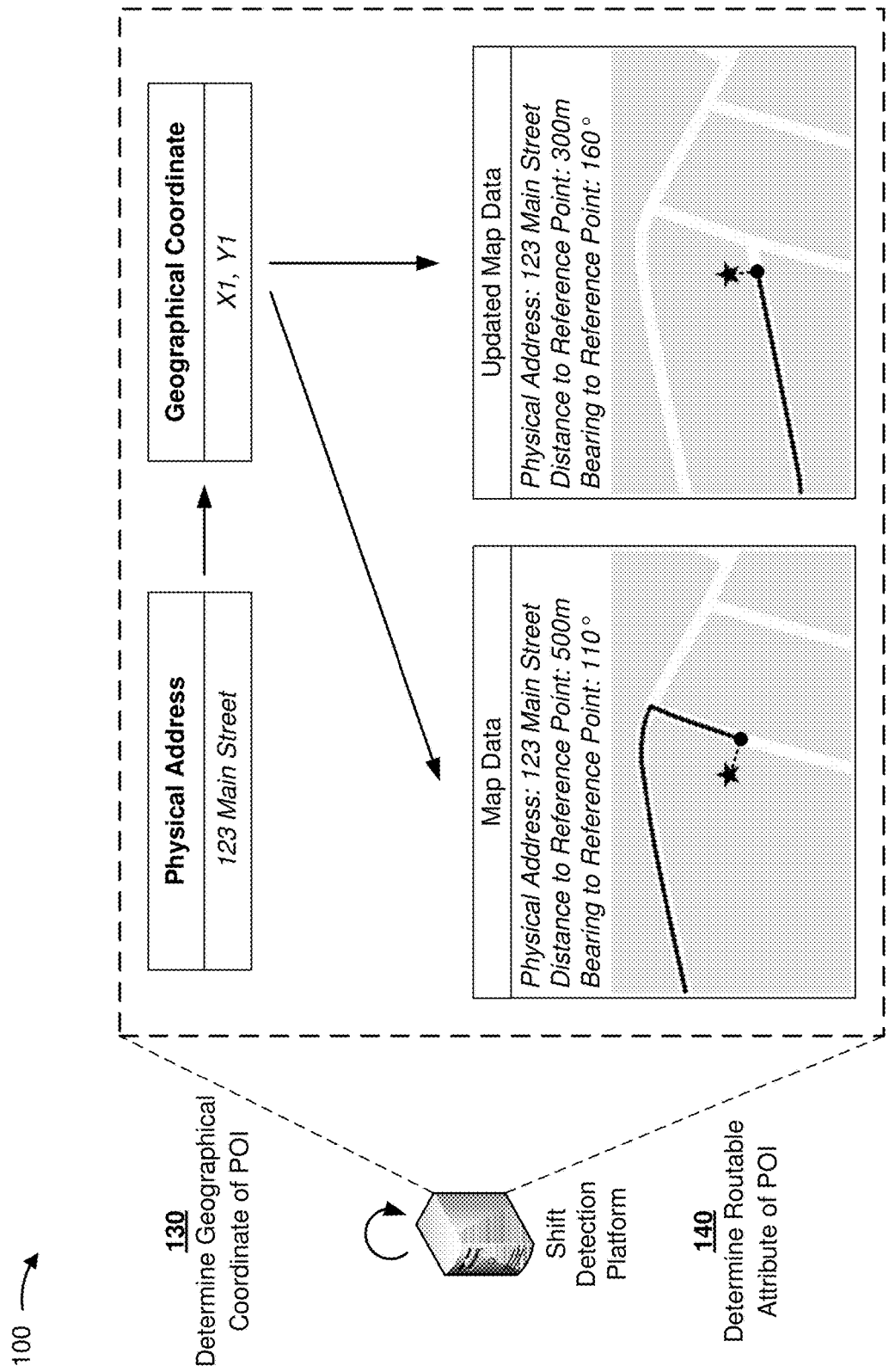

As shown in FIG. 1B, and by reference number 130, the shift detection platform may determine geographical coordinates of the POI based on the location information provided by the subscriber storage device. In some implementations, if the location information was provided as a physical address of the POI, the shift detection platform may geocode the physical address to determine geographical coordinates of the POI using the map data. As shown in FIG. 1B for example, the physical address (e.g., "123 Main Street") may be geocoded into geographical coordinates (e.g., a combination of a latitudinal coordinate represented as "X1" and a longitudinal coordinate represented as "Y1").

In some implementations, as shown for example in FIG. 1B, the geographical coordinates of the POI may be the same in the map data and the updated map data. In some implementations, the geographical coordinates of the POI may differ between the map data and the updated map data, in which case the shift detection platform may separately determine corresponding geographical coordinates of the POI within each map version. In some implementations, if the location information was provided as geographical coordinates of the POI (e.g., determined using the map data), the shift detection platform may reverse-geocode the geographical coordinates using the map data to determine the corresponding physical address of the POI. The shift detection may then geocode the physical address using the updated map data to determine the corresponding geographical coordinates according to the updated map data.

As further shown in FIG. 1B, and by reference number 140, the shift detection platform may determine a routable attribute of the POI based on the geographical coordinates of the POI. A routable attribute may include information that a navigation system may use to determine routing information for the POI, and correspondingly, information that can be used to identify a potential change to the routing information when updating to the updated map data. As shown for example in FIG. 1B, the updated map data shows a new road in proximity to the POI that was not present in the prior map data. In this case, the physical address remains the same, but the routing information has changed. To capture such a change, the shift detection platform may determine a routable attribute relating to the physical address of the POI, a routable attribute relating to a relationship between the POI and a road segment nearest to the POI, and/or another relevant routable attribute.

In some implementations, the shift detection platform may use the routable attribute to detect a change to the routing information caused by a factor other than a change in road geometry. For example, a change to the routing information reflected in the updated map data may be caused by a change to a building and/or a facility located at the POI (e.g., initiated by a subscriber, a customer of the subscriber, and/or another entity managing the building and/or the facility). In some implementations, an entrance and/or a driveway of the POI that was previously used to determine routing information may have been removed or otherwise structurally modified since the release of the prior map data. In some implementations, a new entrance and/or a new driveway may have been constructed at the POI since the release of the prior map data. Such a structural change may cause a change in the physical address of the POI and/or cause the POI to connect to a different point along the nearest road segment or to a different road segment. The shift detection platform may detect the structural change based on the routable attribute relating to the physical address of the POI, the relationship between the POI and the nearest road segment, and/or the like.

In some implementations, the shift detection platform may use the routable attribute to detect a change to the routing information caused by a non-structural change to the building and/or the facility located at the POI. For example, a designation of an entrance and/or a driveway of the POI may have been modified since the release of the prior map data (e.g., in a way that redirects traffic to and from the POI). In some implementations, a driveway previously designated for two-way traffic may have been restricted to one-way traffic, or a driveway previously designated for one-way traffic may have been modified to accept two-way traffic, since the release of the prior map data. In some implementations, a driveway previously used by trucks may have been restricted to passenger vehicles since the release of the prior map data. In some implementations, a different entrance of the POI may have been designated for receiving deliveries since the release of the prior map data. Such a non-structural change to the POI may also cause a change in the physical address and/or cause the POI to connect to a different point along the nearest road segment or to a different road segment. The shift detection platform may detect the non-structural change based on the routable attribute relating to the physical address of the POI, the relationship between the POI and the nearest road segment, and/or the like.

In some implementations, the shift detection platform may determine the routable attribute based on the physical address of the POI. For example, the shift detection platform may determine the physical address of the POI using the map data and the updated map data to uncover a potential inconsistency that can affect routing information. In some implementations, the shift detection platform may reverse-geocode the geographical coordinates of the POI using the map data and the updated map data to identify the physical address of the POI corresponding to each of the map data and the updated map data. In some implementations, the physical address associated with the map data may have already been provided (e.g., via the subscriber server device), in which case the shift detection platform may reverse-geocode the geographical coordinates of the POI using only the updated map data.

In some implementations, the shift detection platform may determine the routable attribute based on a relationship between the POI and a road segment nearest to the POI. As shown in FIG. 1B for example, the shift detection platform may use the geographical coordinates of the POI to locate the POI and a nearby road segment within each of the map data and the updated map data. The shift detection platform may determine proximity to the road segment based on a distance between the POI and a reference point on the road segment (e.g., a point on the road segment nearest to the POI). The shift detection platform may calculate the distance using the geographical coordinates of the POI and the geographical coordinates associated with the road segment (e.g., the geographical coordinates of the reference point, and/or the like). The shift detection platform may calculate the distance using a haversine equation, and/or another method suited to calculate geographical distance.

In some implementations, where there are several road segments located near the POI, the shift detection platform may calculate the distance between the POI and each of the road segments, and identify the nearest road segment based on a comparison of the calculated distances. In some implementations, the road segment nearest to the POI and the corresponding reference point may be different in the map data and the updated map data. For example, due to a change in road geometry (e.g., a road closure, formation of a new road, and/or the like), a road segment previously identified as the nearest road segment to the POI according to the map data may no longer be the nearest road segment according to the updated map data. As shown for example in FIG. 1B, the formation of the new road shown in the updated map data causes the nearest road segment and the corresponding reference point to change.

In some implementations, the shift detection platform may determine the routable attribute based on a particular geometric relationship between the POI and the nearest road segment. For example, the shift detection platform may determine the routable attribute as the distance between the POI and the reference point on the road segment using each of the map data and the updated map data. In some implementations, the shift detection platform may calculate the distance using the geographical coordinates of the POI and the geographical coordinates of the reference point, and based on the haversine equation, and/or another method suited to calculate geographical distance. In some implementations, the shift detection platform may determine the distance between the POI and the reference point based on the distance used to identify the nearest road segment, as discussed above.

In some implementations, the shift detection platform may determine the routable attribute based on a bearing between the POI and the reference point on the nearest road segment. In some implementations, the shift detection platform may determine the bearing from the perspective of the POI (e.g., as the horizontal angle formed between magnetic or true North and a direction to the reference point). In some implementations, the shift detection platform may determine the bearing from the perspective of the reference point. In some implementations, the shift detection platform may determine the bearing based on a reference other than the reference point. In some implementations, the shift detection platform may determine the bearing using a bearing measurement other than a magnetic or true North measurement. In some implementations, the shift detection platform may use other determinations to characterize the geometric relationship between the POI and the nearest road segment.

In some implementations, the shift detection platform may determine the routable attribute based on another relationship between the POI and the nearest road segment. For example, the shift detection platform may determine the routable attribute based on an attribute of the building, the facility, and/or the structure at the POI that connects to the road segment (e.g., a location, an orientation, and/or a dimension of an entrance and/or a driveway to the structure, presence of a gate, and/or the like). In some implementations, the shift detection platform may determine the routable attribute based on an attribute of the nearest road segment (e.g., a direction of traffic on the road segment, a road orientation, a road dimension, a road grade, a road restriction, presence of a center turn lane, presence of a median, presence of an overpass, and/or the like).

Figure 1C:
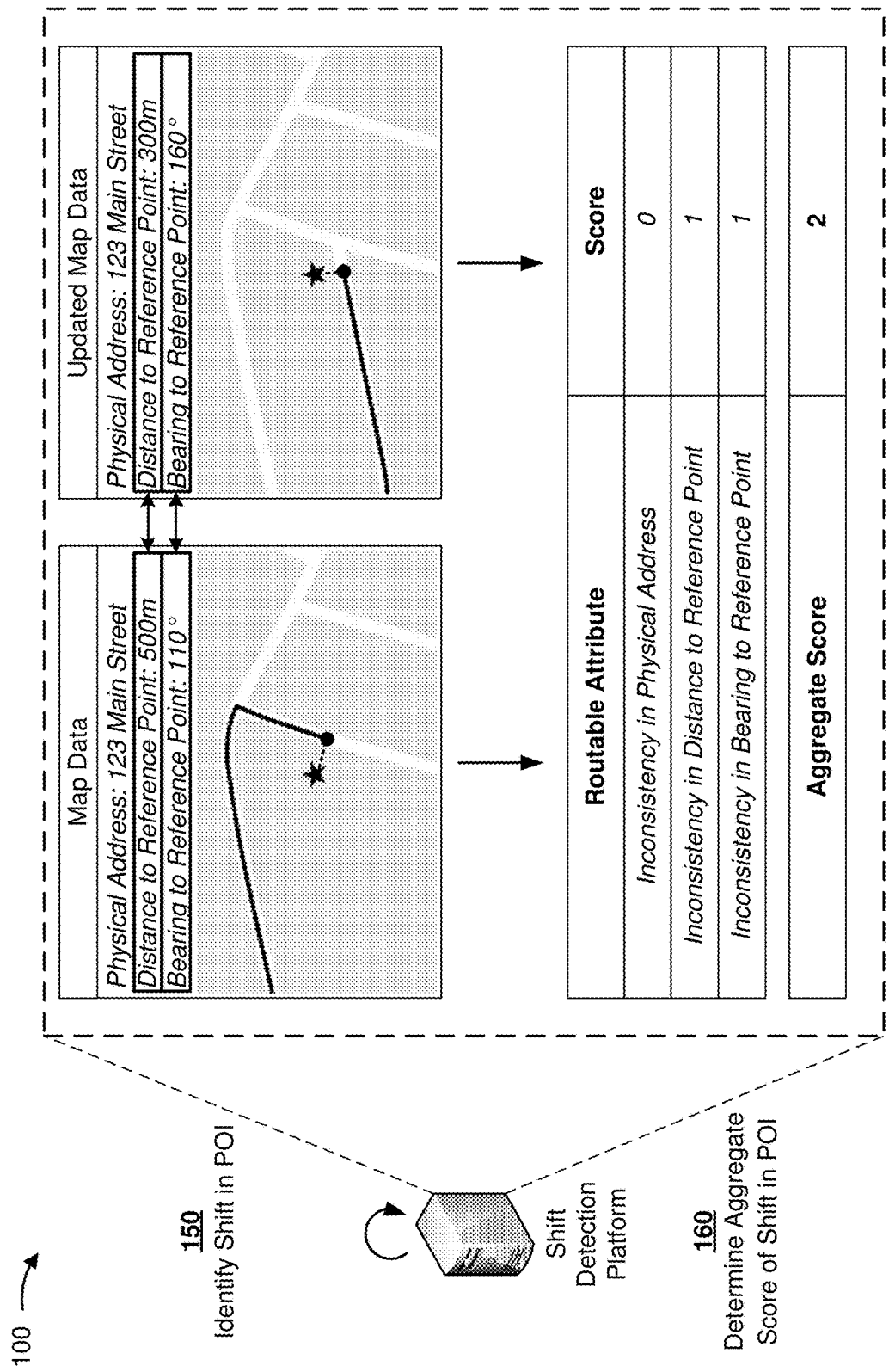

As shown in FIG. 1C, and by reference number 150, the shift detection platform may identify a shift in the POI between the map data and the updated map data. For example, the shift detection platform may identify the shift in the POI (e.g., caused by a new road formed in proximity of the POI and/or the like) based on an inconsistency between the routable attribute of the POI determined using the map data and the updated routable attribute of the POI determined using the updated map data. An inconsistency may correspond to an inconsistency in the physical address of the POI, an inconsistency in the distance between the POI and the reference point, an inconsistency in the bearing between the POI and the reference point, and/or another inconsistency between the map data and the updated map data. In some implementations, the shift detection platform may identify an individual inconsistency if a corresponding threshold amount is satisfied. The shift detection platform may identify a shift in the POI if the number of inconsistencies identified between the map data and the updated map data satisfies a threshold number.

In some implementations, the shift detection platform may identify an inconsistency in the physical address of the POI using a text-based comparison between the physical address determined using the map data and the physical address determined using the updated map data. For example, the shift detection platform may use a similarity analysis between the alphanumeric characters of the physical address of the map data and the physical address of the updated map data, and identify the inconsistency if the similarity does not satisfy a similarity threshold. As shown for example in FIG. 1C, the physical address of the POI determined using the map data (e.g., "123 Main Street") remains the same in the updated map data. In this case, the shift detection platform may not identify an inconsistency in the physical address because there is no difference between the physical address of the map data and the physical address of the updated map data. In some implementations, the shift detection platform may use another metric and/or threshold to identify the inconsistency in the physical address of the POI.

In some implementations, the shift detection platform may identify an inconsistency in the distance between the POI and the reference point using a value-based comparison between the distance determined using the map data and the distance determined using the updated map data. For example, the inconsistency may be identified if a difference between the distance determined using the map data and the distance determined using the updated map data satisfies a threshold amount. As shown for example in FIG. 1C, the distance between the POI and the reference point has changed (e.g., from 500 m in the map data to 300 m in the updated map data). Based on the difference in distance in this case (e.g., a 40% reduction), the shift detection platform may determine the threshold amount (e.g., 20%) is satisfied and identify an inconsistency. In some implementations, the shift detection platform may use another metric and/or threshold to identify the inconsistency in the distance between the POI and the reference point.

In some implementations, the shift detection platform may identify an inconsistency in the bearing between the POI and the reference point using a value-based comparison between the bearing determined using the map data and the bearing determined using the updated map data. For example, the inconsistency may be identified if a difference in the bearing determined using the map data and the bearing determined using the updated map data satisfies a threshold amount. As shown for example in FIG. 1C, the bearing between the POI and the reference point has changed (e.g., from 110° in the map data to 160° in the updated map data). Based on the difference in bearing in this case (e.g., a 50° difference), the shift detection platform may determine the threshold amount (e.g., 25%) is satisfied and identify an inconsistency. In some implementations, the shift detection platform may use another metric and/or threshold to identify the inconsistency in the bearing between the POI and the reference point.

As further shown in FIG. 1C, and by reference number 160, the shift detection platform may determine an aggregate score to determine a magnitude of the identified shift in the POI. For example, the shift detection platform may determine the aggregate score based on an identified inconsistency between the routable attribute of the POI determined using the map data and the updated routable attribute of the POI determined using the updated map data. In some implementations, the aggregate score may be based on an inconsistency in the physical address of the POI, an inconsistency in the distance between the geographical coordinates and the reference point, and/or an inconsistency in the bearing between the geographical coordinates and the reference point. In some implementations, the shift detection platform may determine the aggregate score only once a shift in the POI has been identified to conserve resources that would otherwise be used to calculate an aggregate score in instances where there is no shift in the POI. In some implementations, the shift detection platform may determine the aggregate score irrespective of whether a shift in the POI was identified.

In some implementations, the shift detection platform may determine a score for each inconsistency in the routable attribute identified between the map data and the updated map data. For example, the shift detection platform may determine a first score corresponding to an identified inconsistency in the physical address of the POI, determine a second score corresponding to an identified inconsistency in the distance between the POI and the reference point, and determine a third score corresponding to an identified inconsistency in the bearing between the POI and the reference point. As shown for example in FIG. 1C, the first score may be determined to be "0" because the physical address of the POI remained the same in the updated map data. As further shown for example in FIG. 1C, each of the second score and the third score may be determined to be "1" because inconsistencies were identified in the distance and the bearing between the POI and the reference point.

In some implementations, the shift detection platform may determine the aggregate score based on a combination of the first score, the second score, and the third score. As shown for example in FIG. 1C, the shift detection platform may determine the aggregate score as a sum of the first score, the second score, and the third score. In some implementations, the shift detection platform may determine the aggregate score based on another calculation of the first score, the second score, and/or the third score. In some implementations, the shift detection platform may assign a different weighting factor to one or more of the routable attributes, where a greater weight may be applied to a certain routable attribute having a greater impact on routing information. In some implementations, the shift detection platform may determine the aggregate score based on fewer routable attributes, additional routable attributes, or different routable attributes than those shown in FIG. 1C.

Figure 1D:
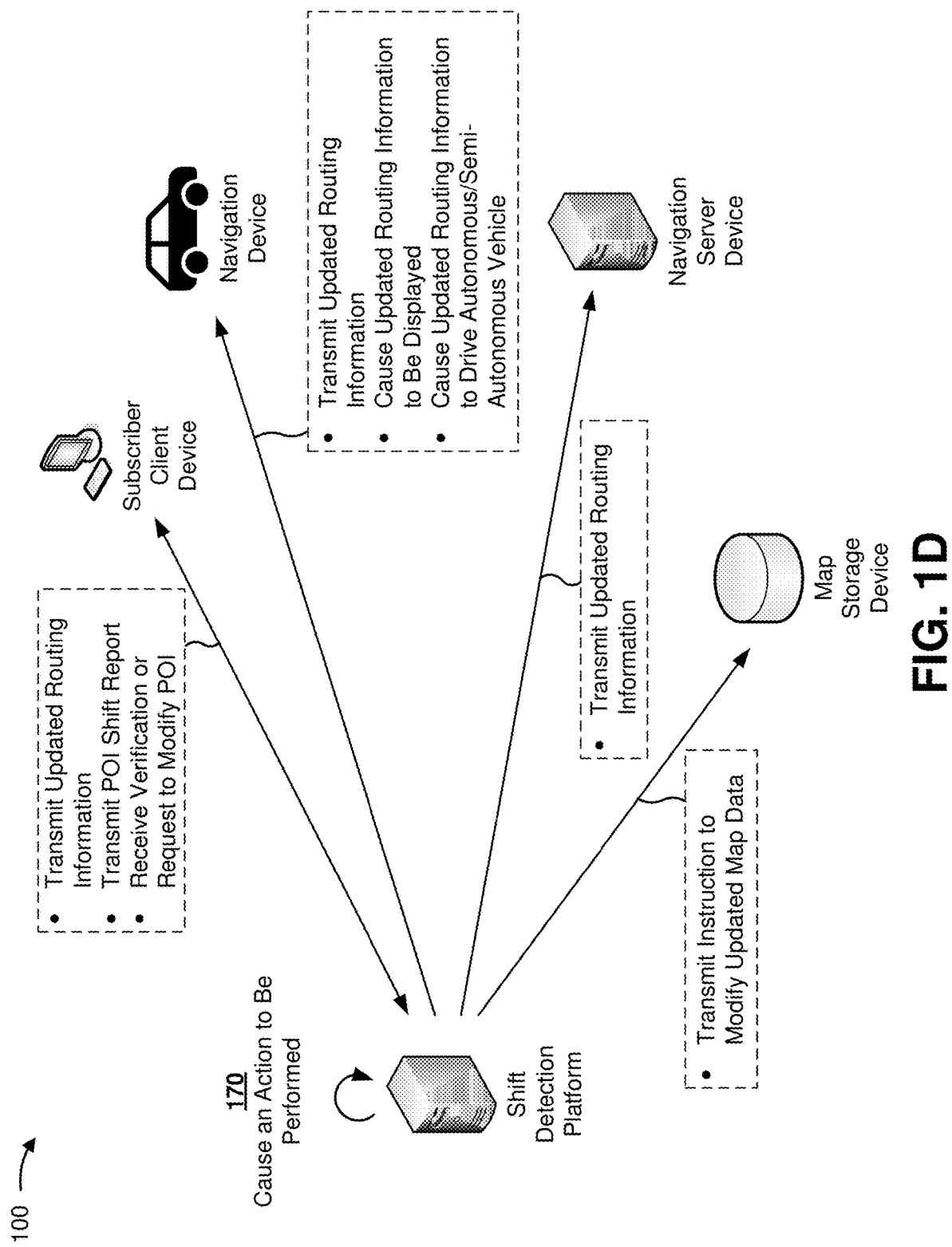

As shown in FIG. 1D, and by reference number 170, the shift detection platform may cause an action to be performed based on the aggregate score. For example, the shift detection platform may compare the aggregate score with a particular threshold to determine the magnitude of the shift in the POI, and cause an action to be performed if the aggregate score satisfies the threshold. In some implementations, the shift detection platform may transmit the updated routing information to the subscriber client device, the navigation server device, and/or the navigation device when the particular threshold is satisfied. In some implementations, the shift detection platform may compare the aggregate score with a plurality of thresholds, and cause a different type of action to be performed based on the particular threshold that the aggregate score satisfies. For example, the shift detection platform may transmit the updated routing information to the subscriber client device when a first threshold is satisfied, and transmit the updated routing information to the navigation server device and/or the navigation device when a second threshold is satisfied. In some implementations, the shift detection platform may use a different threshold to cause a different action to be performed.

In some implementations, the shift detection platform may automatically transmit the updated routing information to the subscriber (e.g., via the subscriber client device) in a format that enables the subscriber to use the updated routing information. For example, the shift detection platform may transmit the updated routing information in the form of a text-based description. In some implementations, the updated routing information may be provided as a file (e.g., an update file, a patch file, and/or the like) that can be installed onto a navigation device used by the subscriber and/or a navigation server device managed by the subscriber. In some implementations, the shift detection platform may automatically transmit the updated routing information (e.g., as an update file, a patch file, and/or the like) to a navigation service provider (e.g., via a navigation server device). In some implementations, the updated routing information may be provided to an end user of a navigation service (e.g., to a navigation device that is implemented within a vehicle navigation system, a mobile device, and/or the like). In some implementations, the updated routing information may be provided directly to a vehicle (e.g., an autonomous vehicle and/or a semi-autonomous vehicle) to cause the vehicle to drive to a POI according to a particular route.

In some implementations, the shift detection platform may generate a shift report based on the shift in the POI and the aggregate score, and transmit the shift report to the subscriber client device. In some implementations, the shift report may include information relating to the POI (e.g., the physical address of the POI, the geographical coordinates of the POI, a unique name of the POI, and/or the like). In some implementations, the shift report may include the routable attribute used to determine the shift in the POI and/or other routing information associated with the POI (e.g., the road segment nearest to the POI, the reference point on the road segment nearest to the POI, the distance between the POI and the reference point, the bearing between the POI and the reference point, and/or the like). In some implementations, the shift report may include the POI and the routing information as determined from each of the map data and the updated map data. In some implementations, the shift report may include the POI and only the updated routing information as determined using the updated map data.

In some implementations, the shift detection platform may generate the shift report to include a reason for the shift in the POI (e.g., the particular inconsistency that was identified), and/or an explanation for the shift in the POI (e.g., a change in the physical address, the road geometry, and/or the like). In some implementations, the shift report may include the aggregate score and/or the scoring scheme used to determine the aggregate score. In some implementations, the shift report may include an image (e.g., a map view) of the POI and the associated routing information. In some implementations, the shift report may be automatically generated as an electronic document that is accessible via the subscriber client device. In some implementations, the shift report may be transmitted to the subscriber client device via an electronic mail, a text or short message service (SMS) message, a notification, an alert, and/or the like. In some implementations, the shift report may be provided via a website hosted by the shift detection platform and/or the subscriber storage device. For example, the shift detection platform may transmit a hyperlink to the subscriber client device that is configured to direct the subscriber client device to the website.

In some implementations, the shift detection platform may generate the shift report to receive input from the subscriber. For example, the shift report may include a text input field, a button, a radio button, a checkbox, a drop-down menu, and/or the like that the subscriber can use to verify the shift in the POI and/or request a modification of the POI via the subscriber client device. With respect to the example shown in FIG. 1C, if the subscriber prefers the updated route using the new road shown in the updated map data, and the subscriber may submit a verification of the shift in POI using the shift report. If the subscriber prefers the prior route shown by the prior map data (e.g., due to easier access to a loading dock), the subscriber may submit a request to modify the POI and/or the routing information of the updated map data (e.g., to revert to the routing information shown in the former map data) using the shift report.

In some implementations, the shift detection platform may generate the shift report to receive input from the subscriber relating to another modification not reflected in the map data or the updated map data. For example, the subscriber may request the POI to be located at a point that is different from that shown in the map data and the updated map data (e.g., due to a more recent structural change to a building and/or a facility located at the POI, a more recent change in designation of an entrance and/or a driveway of the building and/or the facility, and/or the like). In some implementations, the shift report may enable the subscriber to describe the desired modification via a text input field. In some implementations, the shift report may enable the subscriber to mark the desired location of the POI within a map view provided within the shift report.

In some implementations, the shift detection platform may generate the shift report to include a hyperlink that the subscriber can use to submit the verification of the shift in the POI and/or to request modification of the shift detection platform. Based on a verification received from the subscriber client device, the shift detection platform may create a record of the verification, transmit a request or an instruction to the map storage device to release the updated map data, cause the updated map data to be released to the subscriber, cause the updated routing information to be transmitted to a navigation server device, transmit the updated routing information to a navigation server device, and/or the like. Based on a request for modification received by the subscriber client device, the shift detection platform may create a record of the modification request, transmit a request or an instruction to the map storage device to modify the updated map data, cause the modified and updated map data to be released to the subscriber, transmit the updated routing information to a navigation server device, and/or the like.

In this way, the shift detection platform is able to automatically and efficiently identify, assess, and/or verify a shift in a POI within updated map data prior to releasing the updated map data. By automatically identifying the shift in the POI and verifying an associated change in routing information prior to releasing the updated map data, the shift detection platform is able to improve the accuracy of a navigation service. By improving the accuracy of the navigation service, the shift detection platform enables safer and more efficient routing to the POI, and reduces downtime associated with an unwanted shift in the POI. By enabling safer and more efficient routing, the shift detection platform reduces the risk of traffic accidents, reduces wear and tear on vehicles, and conserves energy (e.g., fuel) that would otherwise be used by a misguided driver. By enabling accurate and efficient routing, the shift detection platform conserves computational and/or network resources (e.g., processing resources, memory resources, power resources, communication resources, and/or the like) that would otherwise be used to reroute the driver.

As indicated above, FIGS. 1A-1D are provided as one or more examples. Other examples can differ from what is described with regard to FIGS. 1A-1D.

Figure 2:
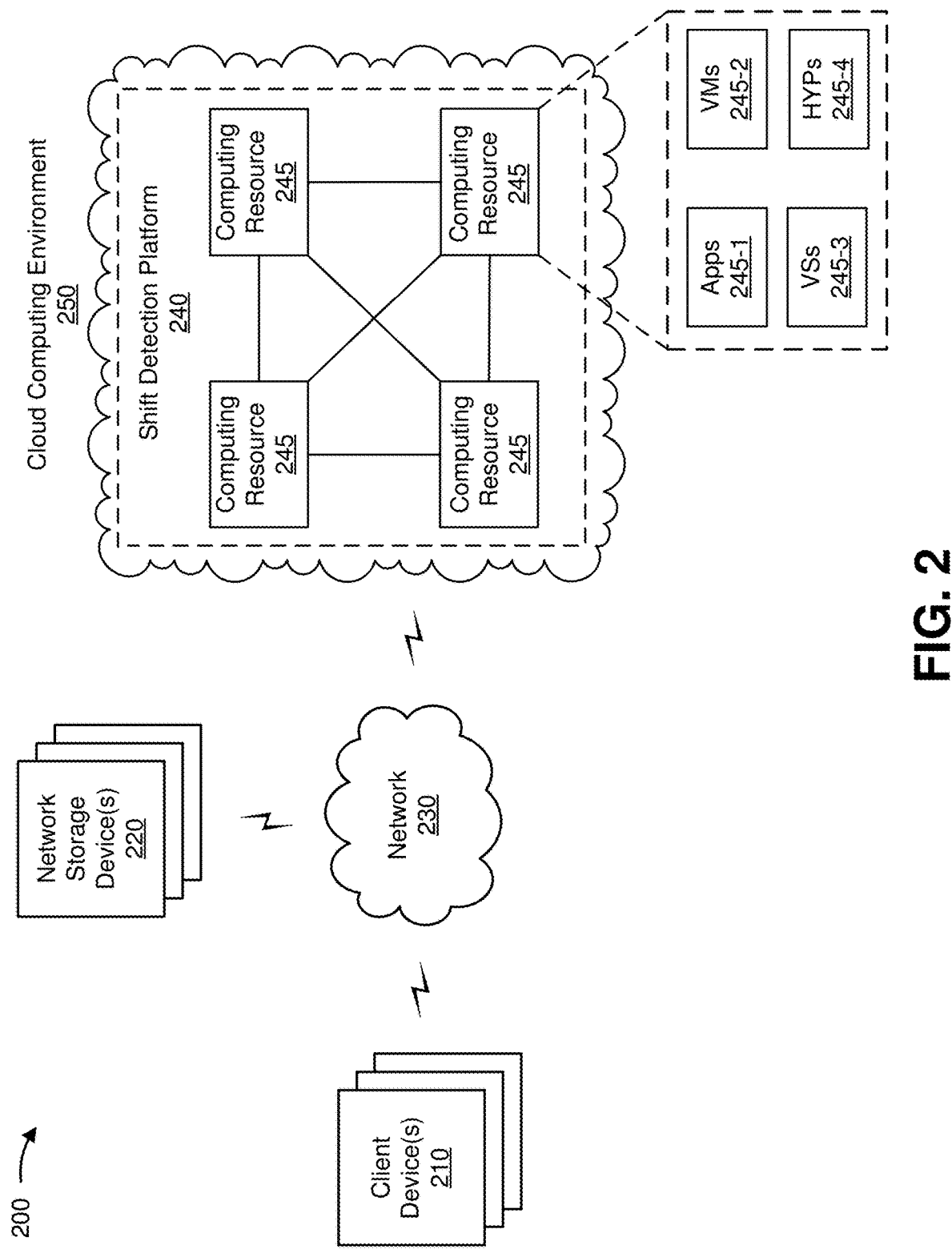
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more subscriber client devices 210 (referred to herein individually as subscriber client device 210 or collectively as subscriber client devices 210), one or more network storage devices 220 (referred to herein individually as network storage device 220 or collectively as network storage devices 220), a network 230, a shift detection platform 240, a computing resource 245, and a cloud computing environment 250. Devices of environment 200 may interconnect via wired connections, wireless connections, or a combination of wired and wireless connections.

Subscriber client device 210 includes one or more devices capable of receiving, generating, storing, processing, and/or providing information, such as location information associated with a POI described herein. For example, subscriber client device 210 may include a communication and/or computing device, such as a laptop computer, a tablet computer, a handheld computer, a desktop computer, a mobile phone (e.g., a smart phone, a radiotelephone, etc.), a gaming device, a wearable communication device (e.g., a smart wristwatch, a pair of smart eyeglasses, etc.), or a similar type of device. In some implementations, subscriber client device 210 may receive information from and/or transmit information to network storage device 220, shift detection platform 240, and/or the like.

Network storage device 220 includes one or more devices capable of storing, processing, and/or routing information. Network storage device 220 may include, for example, a server device, a device that stores a database, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200, such as subscriber client device 210, shift detection platform 240, and/or the like.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Shift detection platform 240 includes one or more computing devices configured to identify shifts in POIs. For example, shift detection platform 240 may determine a set of geographical coordinates and a routable attribute of the POI, identify a shift in the POI based on an inconsistency in the routable attribute between the prior map data and the updated map data, determine an aggregate score for the shift in the POI, and cause an action based on the aggregate score. In some implementations, shift detection platform 240 may be designed to be modular such that certain software components may be swapped in or out depending on a particular need. As such, shift detection platform 240 may be easily and/or quickly reconfigured for different uses. In some implementations, shift detection platform 240 may receive information from and/or transmit information to subscriber client device 210, network storage device 220, and/or the like.

In some implementations, shift detection platform 240 may include a server device or a group of server devices. In some implementations, shift detection platform 240 may be hosted in cloud computing environment 250. Notably, while implementations described herein may describe shift detection platform 240 as being hosted in cloud computing environment 250, in some implementations, shift detection platform 240 may be non-cloud-based or may be partially cloud-based.

Cloud computing environment 250 includes an environment that delivers computing as a service, whereby shared resources, services, and/or the like may be provided to subscriber client device 210, network storage device 220, and/or the like. Cloud computing environment 250 may provide computation, software, data access, storage, and/or other services that do not require end-user knowledge of a physical location and configuration of a system and/or a device that delivers the services. As shown, cloud computing environment 250 may include shift detection platform 240 and computing resource 245.

Computing resource 245 includes one or more personal computers, workstation computers, server devices, or another type of computation and/or communication device. In some implementations, computing resource 245 may host shift detection platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by subscriber client device 210. Application 245-1 may eliminate a need to install and execute the software applications on subscriber client device 210. For example, application 245-1 may include software associated with shift detection platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., subscriber client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
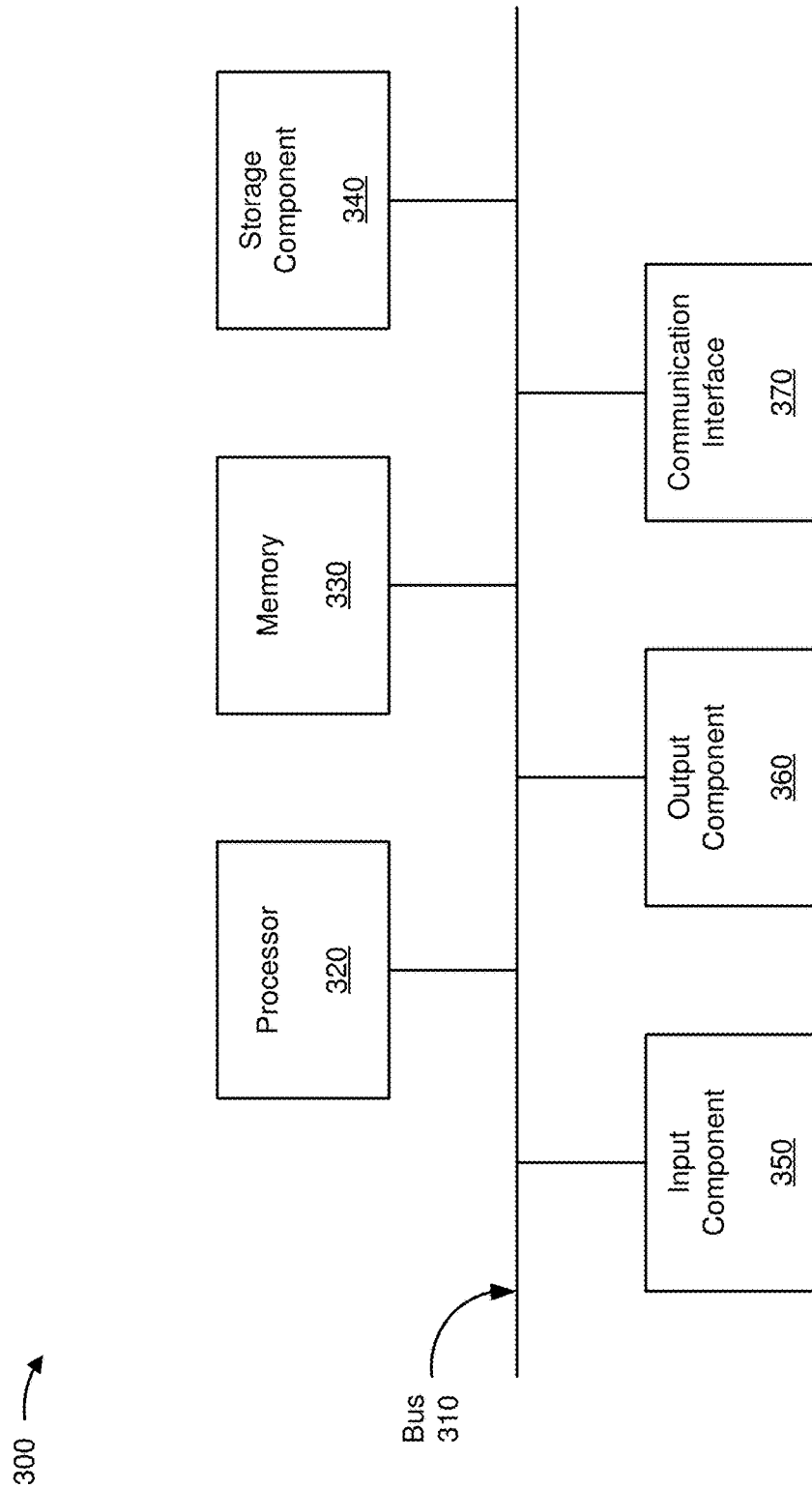
FIG. 3 is a diagram of example components of one or more devices of FIG. 2.

FIG. 3 is a diagram of example components of a device 300. Device 300 may correspond to subscriber client device 210, network storage device 220, shift detection platform 240, and/or computing resource 245. In some implementations, subscriber client device 210, network storage device 220, shift detection platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
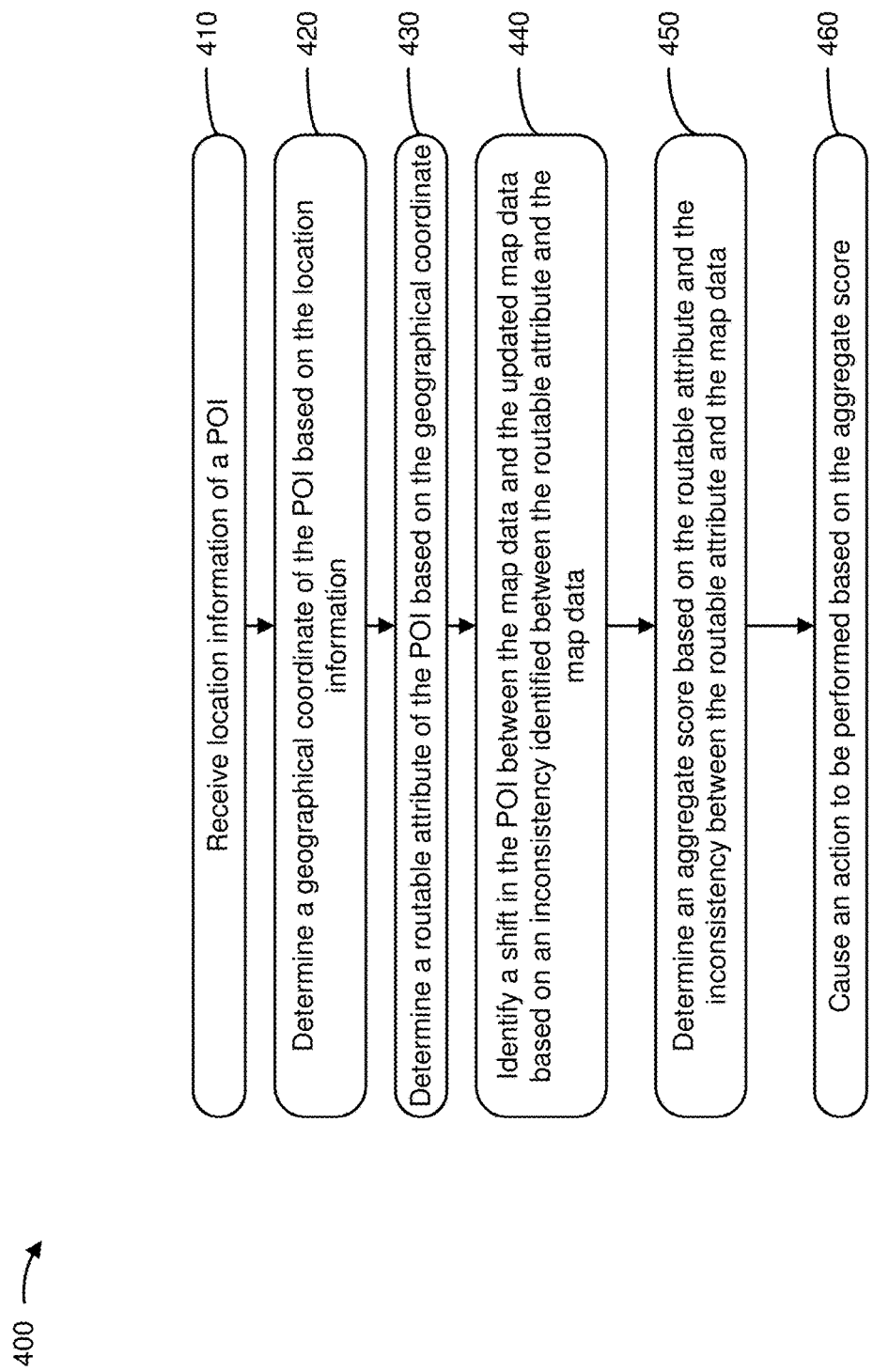
FIG. 4 is a flow chart of an example process for identifying a shift in a point of interest.

FIG. 4 is a flow chart of an example process 400 for identifying a shift in a POI. In some implementations, one or more process blocks of FIG. 4 may be performed by a shift detection platform (e.g., shift detection platform 240). In some implementations, one or more process blocks of FIG. 4 may be performed by another device or a group of devices separate from or including shift detection platform, such as a subscriber client device (e.g., subscriber client device 210), or a network storage device (e.g., network storage device 220).

As shown in FIG. 4, process 400 may include receiving location information of a POI (block 410). For example, the shift detection platform (e.g., using a computing resource 245, a processor 320, a memory 330, a storage component 340, an input component 350, and a communication interface 370, and/or the like) may receive location information of a POI, as described above.

As further shown in FIG. 4, process 400 may include determining a geographical coordinate of the POI based on the location information (block 420). For example, the shift detection platform (e.g., using a computing resource 245, a processor 320, a memory 330, a storage component 340, an input component 350, and a communication interface 370, and/or the like) may determine a geographical coordinate of the POI based on the location information, as described above.

As further shown in FIG. 4, process 400 may include determining a routable attribute of the POI based on the geographical coordinate (block 430). For example, the shift detection platform (e.g., using a computing resource 245, a processor 320, a memory 330, a storage component 340, an input component 350, and a communication interface 370, and/or the like) may determine a routable attribute of the POI based on the geographical coordinate, as described above.

As further shown in FIG. 4, process 400 may include identifying a shift in the POI between the map data and the updated map data based on an inconsistency identified between the routable attribute and the map data (block 440). For example, the shift detection platform (e.g., using a computing resource 245, a processor 320, a memory 330, a storage component 340, an input component 350, and a communication interface 370, and/or the like) may identify a shift in the POI between the map data and the updated map data based on an inconsistency identified between the routable attribute and the map data, as described above.

As further shown in FIG. 4, process 400 may include determining, when the shift in the POI is identified, an aggregate score based on the routable attribute and the inconsistency between the routable attribute and the map data (block 450). For example, the shift detection platform (e.g., using a computing resource 245, a processor 320, a memory 330, a storage component 340, an input component 350, and a communication interface 370, and/or the like) may determine, when the shift in the POI is identified, an aggregate score based on the routable attribute and the inconsistency between the routable attribute and the map data, as described above.

As further shown in FIG. 4, process 400 may include causing an action to be performed based on the aggregate score (block 460). For example, the shift detection platform (e.g., using a computing resource 245, a processor 320, a memory 330, a storage component 340, an output component 360, and a communication interface 370, and/or the like) may cause an action to be performed based on the aggregate score, as described above.

Process 400 may include additional implementations, such as any single implementation or any combination of implementations described below and/or in connection with one or more other processes described elsewhere herein.

In some implementations, when determining the routable attribute, the shift detection platform may determine a distance between the geographical coordinate and the reference point on the road segment, and determine a bearing between the geographical coordinate and the reference point on the road segment.

In some implementations, when identifying the shift in the POI, the shift detection platform may identify the shift in the POI when the inconsistency corresponds to at least one of the physical address of the POI, a distance between the geographical coordinate and the reference point, or a bearing between the geographical coordinate and the reference point.

In some implementations, when determining the aggregate score, the shift detection platform may determine the aggregate score based on one or more of an inconsistency in the physical address of the POI, an inconsistency in a distance between the geographical coordinate and the reference point, or an inconsistency in a bearing between the geographical coordinate and the reference point.

In some implementations, when determining the aggregate score, the shift detection platform may determine a first score when an inconsistency in the physical address of the POI is identified, determine a second score when an inconsistency in a distance between the geographical coordinate and the reference point is identified, determine a third score when an inconsistency in a bearing between the geographical coordinate and the reference point is identified, and determine the aggregate score based on a combination of the first score, the second score, and the third score.

In some implementations, when causing the action to be performed, the shift detection platform may generate a shift report based on the shift in the POI and the aggregate score, transmit the shift report to a subscriber client device, receive a request from the subscriber client device to modify one or more of the physical address of the POI or the geographical coordinate of the POI, and modify the updated map data according to the request.

In some implementations, when causing the action to be performed, the shift detection platform may compare the aggregate score with a threshold, and modify the updated map data according to the shift in the POI when the aggregate score satisfies the threshold.

In some implementations, when causing the action to be performed, the shift detection platform may compare the aggregate score with a threshold, transmit updated routing information relating to the shift in the POI to a navigation device when the aggregate score satisfies the threshold, and cause the updated routing information to be used by the navigation device.

In some implementations, when determining the geographical coordinate, the shift detection platform may geocode a physical address of the POI to determine the geographical coordinate.

In some implementations, when causing the action to be performed, the shift detection platform may compare the aggregate score and a threshold, and transmit updated routing information relating to the shift in the POI to one or more of a subscriber client device, a navigation server device, or a navigation device associated with a vehicle when the aggregate score satisfies the threshold.

In some implementations, when causing the action to be performed, the shift detection platform may generate a shift report based on the shift in the POI and the aggregate score, transmit the shift report to a subscriber client device, receive a verification of the shift in the POI associated with the POI from the subscriber client device, and modify the updated map data according to the verification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, location information of a point of interest;
   determining, by the device and using map data, a geographical coordinate of the point of interest, based on the location information, and a first routable attribute of the point of interest;

determining, by the device and using updated map data, a second routable attribute of the point of interest based on the geographical coordinate,
  wherein the first routable attribute and the second routable attribute include one or more of a physical address associated with the geographical coordinate or a relationship between the geographical coordinate and a road segment nearest to the geographical coordinate,
  wherein the updated map data is updated relative to the map data, and
  wherein the road segment is identified, from a plurality of road segments and for each of the map data and the updated map data, based on selecting the road segment with a shortest distance between the geographical coordinate and a reference point on the road segment nearest to the geographical coordinate;
determining, by the device and based on a difference between first bearing information associated with the first routable attribute and second bearing information associated with the second routable attribute, an inconsistency between the first routable attribute and the second routable attribute,
  wherein the first bearing information and the second bearing information are associated with the point of interest;
identifying, by the device and based on determining the difference between the first bearing information and the second bearing information, a shift in the point of interest between the map data and the updated map data;
determining, by the device and when the shift in the point of interest is identified, an aggregate score based on the inconsistency; and
causing, by the device, one or more actions to be performed based on comparing the aggregate score to a plurality of thresholds,
  wherein the one or more actions include:
    transmitting updated routing information, that is determined based on the shift, to a subscriber device associated with a subscription service associated with the map data when the aggregate score satisfies a first threshold of the plurality of thresholds,
    transmitting the updated routing information to a navigation server device when the aggregate score satisfies a second threshold of the plurality of thresholds,
    transmitting the updated routing information to a navigation device associated with a vehicle when the aggregate score satisfies a third threshold of the plurality of thresholds,
      wherein the first threshold, the second threshold, and the third threshold are different from each other; and
    causing the updated routing information to be used by the navigation device.

2. The method of claim 1, wherein the inconsistency is a first inconsistency,
  wherein determining the aggregate score comprises:
    determining a first score based on the first inconsistency;
    determining a second score based on whether a second inconsistency in the physical address of the point of interest is identified;
    determining a third score based on whether a third inconsistency in a distance between the geographical coordinate and the reference point is identified; and
    determining the aggregate score based on a combination of the first score, the second score, and the third score.

3. The method of claim 1, wherein causing the one or more actions to be performed comprises:
  generating a shift report based on the shift in the point of interest and the aggregate score;
  transmitting the shift report to a client device;
  receiving, from the client device, a request to modify one or more of the physical address of the point of interest or the geographical coordinate of the point of interest; and
  modifying the updated map data according to the request.

4. The method of claim 1, wherein causing the one or more actions to be performed comprises:
  comparing the aggregate score with a fourth threshold,
    wherein the fourth threshold is different from the first threshold, second threshold, and the third threshold; and
  modifying, when the aggregate score satisfies the fourth threshold, the updated map data according to the shift in the point of interest.

5. The method of claim 1, wherein the first bearing information and the second bearing information are associated with bearing information between the geographical coordinate and the reference point.

6. The method of claim 1, wherein causing the one or more actions to be performed comprises:
  modifying, based on the aggregate score, the updated map data; and
  causing an autonomous vehicle associated with the device to be driven to the point of interest based on the modified updated map data.

7. The method of claim 1, wherein causing the one or more actions to be performed comprises:
  modifying, based on the aggregate score, the updated map data; and
  providing information associated with the modified updated map data.

8. A device, comprising:
  one or more memories; and
  one or more processors, communicatively coupled to the one or more memories, to:
    receive location information of a point of interest;
    determine, using map data, a geographical coordinate of the point of interest, based on the location information, and a first routable attribute of the point of interest;
    determine, using updated map data, a second routable attribute of the point of interest based on the geographical coordinate,
      wherein the first routable attribute and the second routable attribute include a relationship between the geographical coordinate and a road segment nearest to the geographical coordinate,
      wherein the updated map data is updated relative to the map data, and
      wherein the road segment is identified, from a plurality of road segments and for each of the map data and the updated map data, based on selecting the road segment with a shortest distance between the geographical coordinate and a reference point on the road segment nearest to the geographical coordinate;

determine, based on a difference between first bearing information associated with the first routable attribute and second bearing information associated with the second routable attribute, an inconsistency between the first routable attribute and the second routable attribute,
  wherein the first bearing information and the second bearing information are associated with the point of interest;
identify, based on determining the difference between the first bearing information and the second bearing information, a shift in the point of interest between the map data and the updated map data;
determine, when the shift in the point of interest is identified, an aggregate score based on the inconsistency; and
cause one or more actions to be performed based on comparing the aggregate score to a plurality of thresholds,
  wherein the one or more actions include:
    transmitting updated routing information, that is determined based on the shift, to a subscriber device associated with a subscription service when the aggregate score satisfies a first threshold of the plurality of thresholds,
    transmitting the updated routing information to a navigation service device when the aggregate score satisfies a second threshold, and
    transmitting the updated routing information to a navigation device associated with a vehicle when the aggregate score satisfies a third threshold,
    wherein the first threshold, the second threshold, and the third threshold are different from each other; and
    causing the updated routing information to be used by the navigation device.

9. The device of claim 8, wherein the one or more processors, when determining the geographical coordinate, are to:
geocode a physical address of the point of interest to determine the geographical coordinate.

10. The device of claim 8, wherein the one or more processors, when causing the one or more actions to be performed, are to:
generate a shift report based on the shift in the point of interest and the aggregate score;
transmit the shift report to a client device;
receive, from the client device, a request to modify the geographical coordinate of the point of interest; and
modify the updated map data according to the request.

11. The device of claim 8, wherein the first bearing information and the second bearing information are associated with bearing information between the geographical coordinate and the reference point.

12. The device of claim 8, wherein the one or more processors, when causing the one or more actions to be performed, are to:
modify, based on the aggregate score, the updated map data; and
provide information associated with the modified updated map data.

13. The device of claim 8, wherein the map data is a prior release of map data associated with the subscription service and the updated map data is associated with a newer release of map data associated with the subscription service, and wherein information associated with the shift in the point of interest is provided to the subscriber device.

14. The device of claim 8, wherein the vehicle is an autonomous vehicle.

15. The device of claim 8, wherein the one or more actions further comprises:
causing the updated routing information to be displayed.

16. A non-transitory computer-readable medium storing instructions, the instructions comprising:
one or more instructions that, when executed by one or more processors, cause the one or more processors to:
receive location information of a point of interest;
determine, using map data, a geographical coordinate of the point of interest, based on the location information, and a routable attribute of the point of interest;
determine, using updated map data, an updated routable attribute of the point of interest based on the geographical coordinate,
  wherein the routable attribute and the updated routable attribute include one or more of a physical address associated with the geographical coordinate or a relationship between the geographical coordinate and a road segment nearest to the geographical coordinate,
  wherein the updated map data is updated relative to the map data,
  wherein the updated routable attribute is updated relative to the routable attribute, and
  wherein the road segment is identified, from a plurality of road segments and for each of the map data and the updated map data, based on selecting the road segment with a shortest distance between the geographical coordinate and a reference point on the road segment nearest to the geographical coordinate;
determine, based on a difference between first bearing information associated with the routable attribute and second bearing information associated with the updated routable attribute, an inconsistency between the routable attribute and the updated routable attribute,
  wherein the first bearing information and the second bearing information are associated with the point of interest;
identify, based on determining the difference between the first bearing information and the second bearing information, a shift in the point of interest between the map data and the updated map data;
determine, when the shift in the point of interest is identified, an aggregate score based on the inconsistency; and
cause one or more actions to be performed based on comparing the aggregate score to a plurality of threshold,
  wherein the one or more actions include:
    transmitting updated routing information, that is determined based on the shift, to a subscriber device associated with a subscription service when the aggregate score satisfies a first threshold of the plurality of thresholds,
    transmitting the updated routing information to a navigation service device when the aggregate score satisfies a second threshold, and
    transmitting the updated routing information to a navigation deice associated with a vehicle when the aggregate score satisfies a third threshold, wherein the first threshold, the second threshold, and the third threshold are different from each other and causing the updated routing information to be used by the navigation device.

17. The non-transitory computer-readable medium of claim 16, wherein the inconsistency is a first inconsistency, and wherein the one or more instructions, that cause the one or more processors to determine the aggregate score, cause the one or more processors to:

determine a first score based on the first inconsistency;

determine a second score based on whether a second inconsistency in the physical address of the point of interest is identified;

determine a third score based on whether a third inconsistency in a distance between the geographical coordinate and the reference point is identified; and determine the aggregate score based on a combination of the first score, the second score, and the third score.

18. The non-transitory computer-readable medium of claim 16, wherein the one or more instructions, that cause the one or more processors to cause the one or more actions to be performed, cause the one or more processors to:

generate a shift report based on the shift in the point of interest and the aggregate score, transmit the shift report to a client device;

receive, from the client device, a verification of the shift in the point of interest associated with the point of interest; and modify the updated map data according to the verification.

19. The non-transitory computer-readable medium of claim 16, wherein the one or more instructions, that cause the one or more processors to cause the one or more actions to be performed, cause the one or more processors to:

compare the aggregate score and a fourth threshold, wherein the fourth threshold is different from the first threshold, second threshold, and the third threshold; and modify, when the aggregate score satisfies the fourth threshold, the updated map data according to the shift in the point of interest.

20. The non-transitory computer-readable medium of claim 16, wherein the first bearing information and the second bearing information are associated with bearing information between the geographical coordinate and the reference point.

* * * * *